US00RE43506E

(19) United States
(12) Reissued Patent
Ebenezer et al.

(10) Patent Number: US RE43,506 E
(45) Date of Reissued Patent: Jul. 17, 2012

(54) COIL COUPLING

(75) Inventors: Desmond Nullan Ebenezer, UpHolland (GB); Richard Paul Northrop, Wigan (GB); James Stephen Mahon, Bolton (GB)

(73) Assignee: GMC-1 Prosys Limited, Skelmersdale (GB)

(21) Appl. No.: 29/367,734

(22) Filed: Aug. 12, 2010

Related U.S. Patent Documents

Reissue of:
(64) Patent No.: Des. 599,233
Issued: Sep. 1, 2009
Appl. No.: 29/327,623
Filed: Nov. 10, 2008

(30) Foreign Application Priority Data

May 14, 2008 (EM) ..... 000932892

(51) LOC (9) Cl. ..... 10-04
(52) U.S. Cl. ..... D10/80
(58) Field of Classification Search ..... D10/80; 335/282; 336/120; 342/440; 192/84.951, 192/84.961
See application file for complete search history.

(56) References Cited

U.S. PATENT DOCUMENTS

| | | | | |
|---|---|---|---|---|
| 2,229,461 | A * | 1/1941 | Kummich | 336/120 |
| 3,833,871 | A * | 9/1974 | Fisher et al. | 335/282 |
| 6,392,524 | B1 * | 5/2002 | Biegelsen et al. | 336/200 |
| 7,598,724 | B2 * | 10/2009 | Howell et al. | 324/127 |
| 2008/0211484 | A1 * | 9/2008 | Howell et al. | 324/127 |

* cited by examiner

*Primary Examiner* — Sandra Snapp
(74) *Attorney, Agent, or Firm* — The Webb Law Firm

(57) CLAIM

The ornamental design for a coil coupling, as shown and described.

DESCRIPTION

FIG. 1 is a front, left perspective view of a coil coupling, in an open configuration, showing our new design;
FIG. 2 is the design shown in FIG. 1 in a closed configuration;
FIG. 3 is a front, right perspective view of the design shown in FIG. 2;
FIG. 4 is a left side view thereof;
FIG. 5 is a right side view thereof;
FIG. 6 is a top plan view thereof; and,
FIG. 7 is a bottom plan view thereof.

1 Claim, 7 Drawing Sheets

Figure 1:
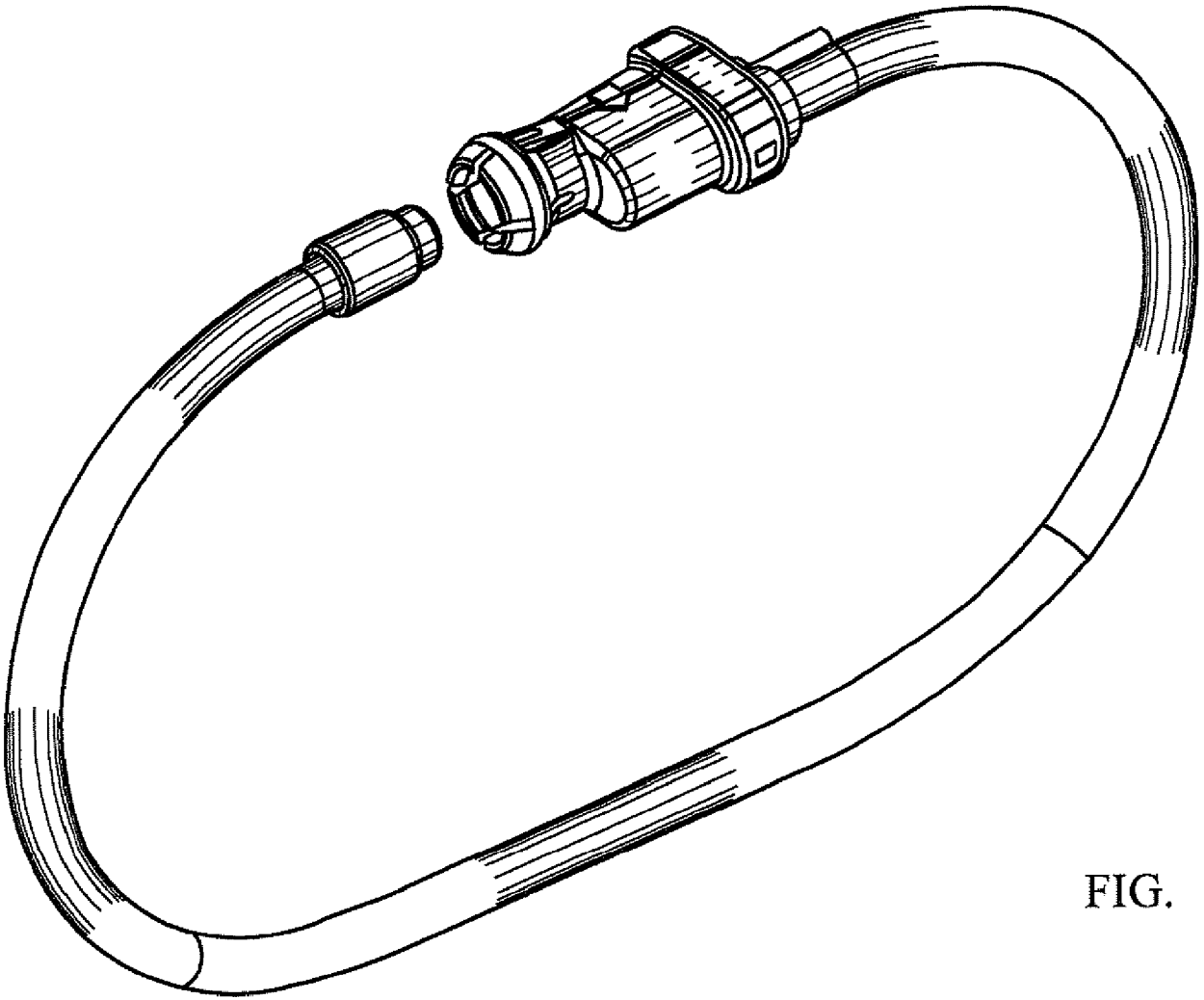
Figure 2:
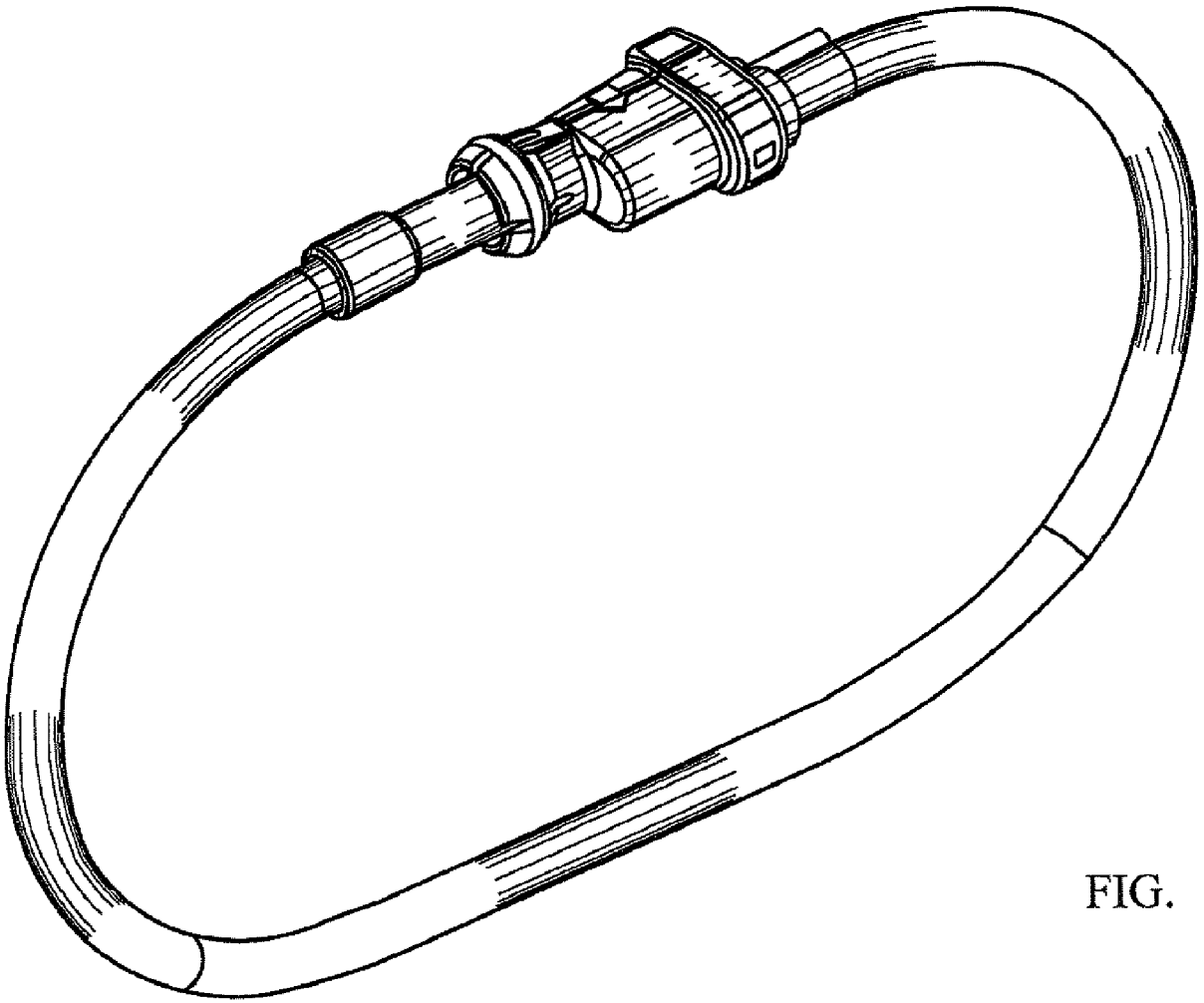
Figure 3:
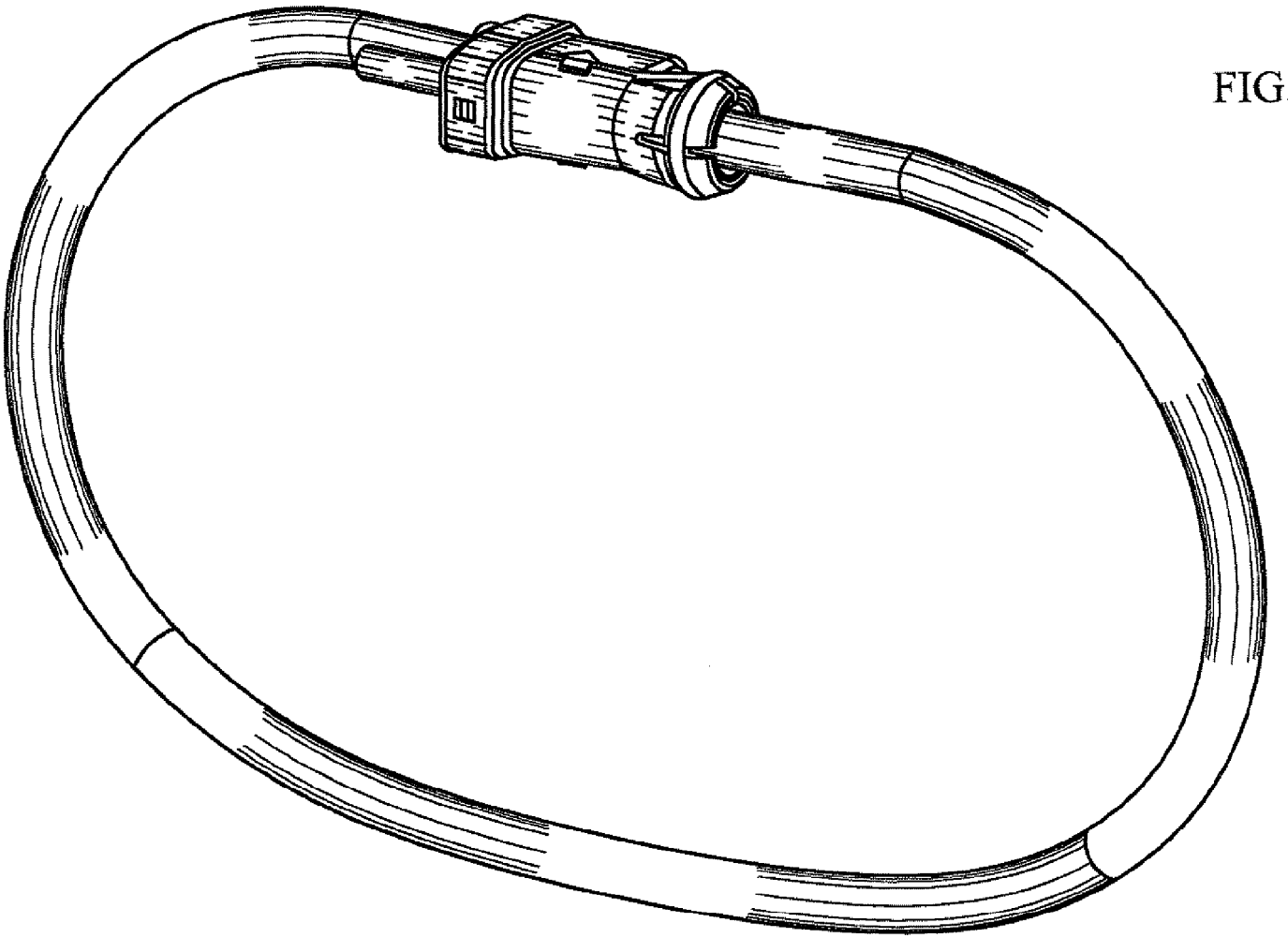
Figure 4:
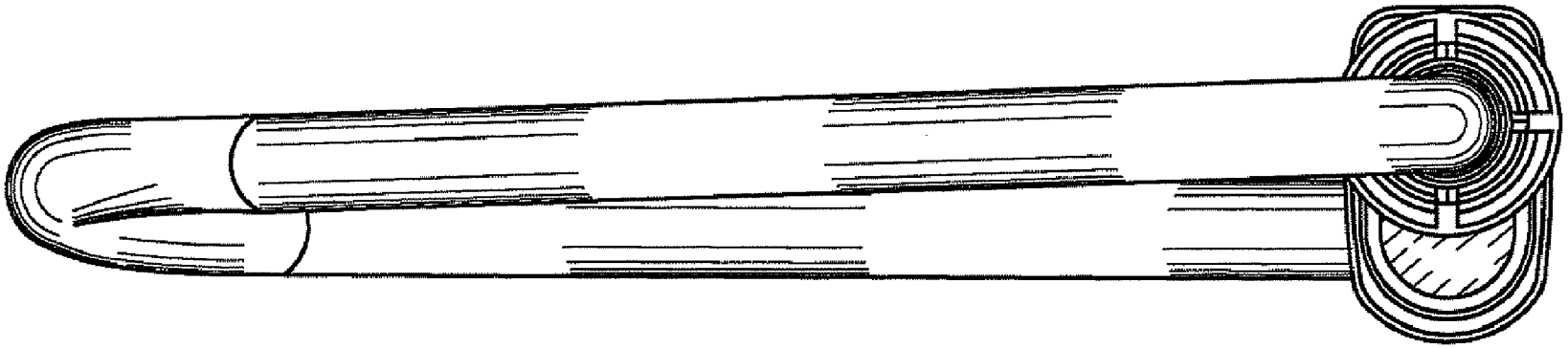
Figure 5:
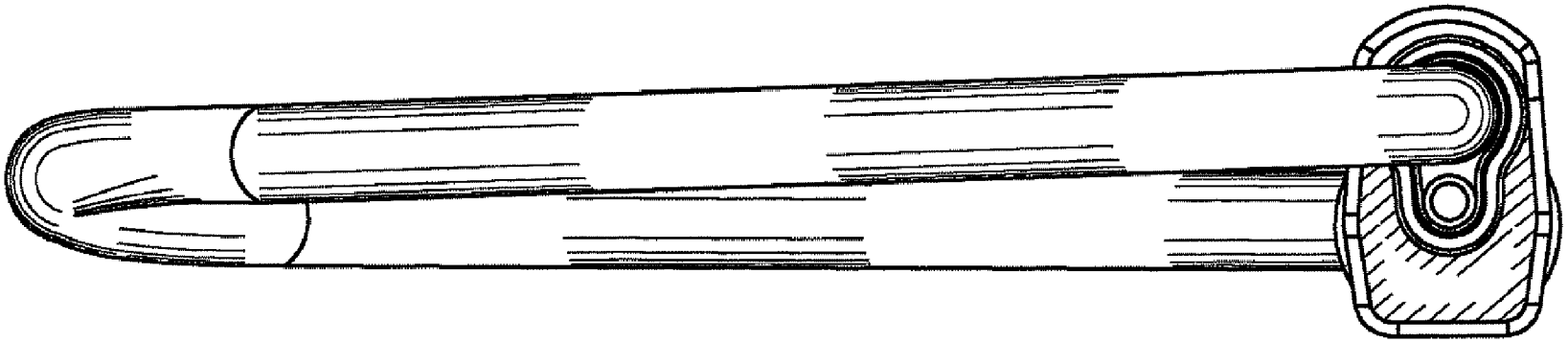
Figure 6:
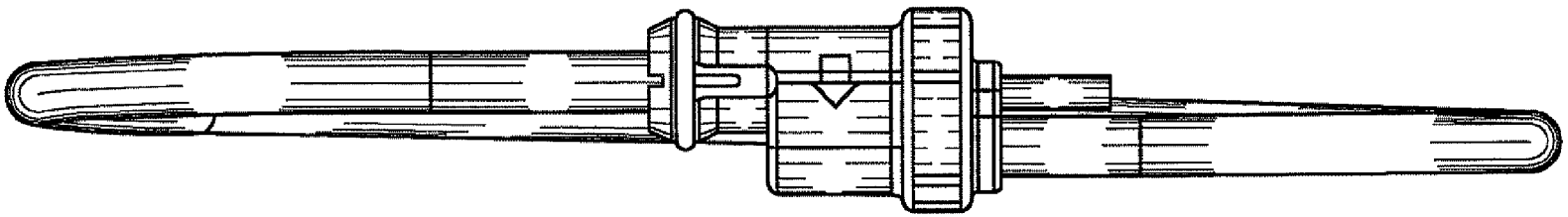
Figure 7:
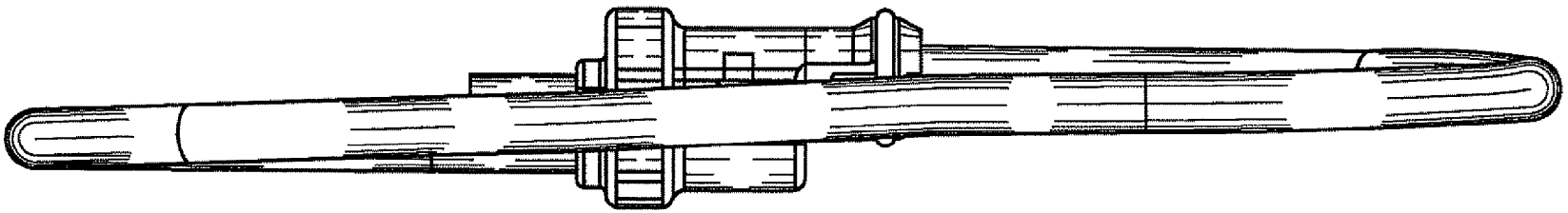

Matter enclosed in heavy brackets [ ] appears in the original patent but forms no part of this reissue; matter printed in italics indicates the additions made by reissue.

UNITED STATES PATENT AND TRADEMARK OFFICE

CERTIFICATE OF CORRECTION

PATENT NO. : RE43,506 E
APPLICATION NO. : 29/367734
DATED : July 17, 2012
INVENTOR(S) : Desmond Nullan Ebenezer et al.

It is certified that error appears in the above-identified patent and that said Letters Patent is hereby corrected as shown below:

Cover of Patent, Column 1, Item (30) Foreign Application Priority Data, Line 1, delete "(EM)" and insert -- (EU) --

Signed and Sealed this
Sixth Day of November, 2012

David J. Kappos

David J. Kappos
*Director of the United States Patent and Trademark Office*